(12) United States Patent (10) Patent No.: US 6,220,365 B1
Birchmier (45) Date of Patent: Apr. 24, 2001

(54) APPARATUS AND METHOD FOR USING AN IMPLEMENT TRANSPORT ASSEMBLY

(76) Inventor: Jerry R. Birchmier, 428 Elmdale Ave., Ottumwa, IA (US) 52501

(*) Notice: Subject to any disclaimer, the term of this patent is extended or adjusted under 35 U.S.C. 154(b) by 0 days.

(21) Appl. No.: 09/150,715

(22) Filed: Sep. 10, 1998

(51) Int. Cl.⁷ .................................................. A01B 51/00
(52) U.S. Cl. .............................................................. 172/274
(58) Field of Search ..................................... 172/274, 272

(56) References Cited

U.S. PATENT DOCUMENTS

| | | | |
|---|---|---|---|
| 3,978,929 | * 9/1976 | Clark | ................................ 172/274 X |
| 5,044,448 | * 9/1991 | Lynch et al. | ........................... 172/272 |

FOREIGN PATENT DOCUMENTS

| | | | |
|---|---|---|---|
| 536053 | * 3/1955 | (BE) | ...................................... 172/274 |
| 1110932 | * 7/1961 | (DE) | ...................................... 172/274 |
| 1122311 | * 1/1962 | (DE) | ...................................... 172/274 |
| 1166846 | * 11/1958 | (FR) | ...................................... 172/274 |

* cited by examiner

Primary Examiner—Christopher J. Novosad
(74) Attorney, Agent, or Firm—Zarley, McKee, Thomte, Voorhees & Sease (57) ABSTRACT

A method of and apparatus for transporting farm implement sideways, on narrow passageways. The apparatus comprising a hitch assembly, carrier assembly, trailer assembly, and a turret assembly. The farm implement is attached to the turret assembly, which allows the implement to be rotated ninety degrees via the turret. To move the farm implement the trailer assembly is extended downward lifting the implement up from the ground, the implement is then rotated so that it aligns parallel to the carrier assembly. The turret assembly is then locked in position for transport. In the field the turret assembly is unlocked and rotated ninety degrees, the trailer assembly is raised, which lowers the implement to the ground. The apparatus is connected to a farm tractor's three point hitch, hydraulic system and power takeoff. The three point hitch raises the apparatus hitch and tongue during transport and lowers the hitch and tongue during field work. The tractors hydraulic system provides power to raise and lower the trailer assembly, rotates the turret assembly and provides power to the locking device.

29 Claims, 5 Drawing Sheets

APPARATUS AND METHOD FOR USING AN IMPLEMENT TRANSPORT ASSEMBLY

BACKGROUND OF THE INVENTION

This invention relates to an apparatus for transporting a large pull type farm implement to a farm field for work. Existing methods of transporting large pull type implements to the field generally include hauling the implement on a trailer, or pulling the implement sideways on wheels, or folding the implement to make it narrow enough to pull down the roadway. Usually the trailer method is not convenient, it requires loading the trailer, something to pull the trailer, unloading from the trailer and hooking up to the tractor. Secondly putting a wheels on a implement to pull it sideways sometimes is not practical by design and causes problems in the field work. The third method of folding a implement can cause design problems and additional expense, and can cause the implement to be inferior to nonfolding implements.

SUMMARY OF THE INVENTION

Accordingly, it is the object of the present invention to provide an implement transport arrangement which is particularly suited to moving a farm implement on a roadway safely, conveniently and economically, and when reaching the field transforming into part of the implements working parts, and function as part of the implement in a safe, convenient and economical manner.

According to the invention, one thing that makes the implement transport system unique is that it adds desirable characteristics to the implement that it is affixed to when the implement is in working mode in the field. There are four assemblies in the implement transport, the hitch assembly, the carrier assembly, the turret assembly and the trailer assembly. The hitch assembly, the carrier assembly and the turret assembly are active assemblies when the implement is engaged in field work. The hitch assembly becomes the implements hitch, the carrier assembly becomes the implements tongue, and the carrier assembly and turret assembly become the implements main frame structure. So these three assemblies perform functions in both field mode and transport mode. Using these three assemblies in field mode and transport mode provides for and economical system. A second unique and desirable characteristic of the implement transport is that it is positioned above the implement and can be made the height needed to fit the implement so as not to impose design restrictions in the implement. A third unique and desirable characteristic of the implement transport is using pivot tubes versus pivot pins in the hitch horizontal pivot and in the turret horizontal pivot. This provides a means to route the mechanical power take off from the tractor to the implement thru the center of the hitch pivot tubes and thru the center of the turret pivot tube. Routing the mechanical power take off thru the center of the pivot tubes puts the mechanical power vertical drive shafts on the same axis as the pivot tubes, which eliminates binding the mechanical drive shafts when turning corners, and provides for a very efficient energy transfer from the tractor to the implement. Also, this arrangement provides a means to route mechanical power to a side pull center pivot machine such as a mower conditioner efficiently. A fourth desirable characteristic of the implement transport is its easy transformation from field mode to transport mode and from transport mode to field mode. All functions to switch modes are performed from the tractor, basically, it is raise the transport, rotate the implement to the desired position and it is ready for transport, to ready for work, rotate the implement to the desired position, lower the transport and it is ready for work.

A BRIEF DESCRIPTION OF THE DRAWINGS

FIGS. 1 through 11 illustrates the arrangement of the present invention referred to as the Implement Transport PLUS (Power Link Utility System), also referred to as the Implement Transport and also referred to as the Transport. The Implement Transport PLUS is comprised of the Transport Hitch, Transport Carrier, the Transport Trailer and the Transport Turret. Further features will become more readily apparent from the detailed description of the invention taken in conjunction with the accompanying drawings wherein:

DESCRIPTION OF PREFERRED EMBODIMENT

Implement Transport Description—Table of Contents

01. Transport Hitch Assembly 01
02. Transport Hitch Tongue Gear Box 02
03. Transport Hitch Tongue Gear Box Horizontal Power Shaft 03
04. Transport Hitch Tongue Gear Box Vertical Power Shaft 04
05. Transport Hitch Tongue Gear Box Support Brackets 05
06. Transport Hitch Tongue Tube 06
07. Transport Hitch Tongue Pivot Pin 07
08. Transport Hitch Tongue Sleeve Tube 08
09. Transport Hitch Tongue Pivot Plate 09
10. Transport Hitch Cross Member Pivot Plate 10
11. Transport Hitch Pivot Tube 11
12. Transport Hitch Pivot Tube Collar 12
13. Transport Hitch Top Horizontal Frame Tube 13
14. Transport Hitch Top Frame Sleeve Tube 14

15. Transport Hitch Bottom Horizontal Frame Tube 15
16. Transport Hitch Right Vertical Frame Tube 16
17. Transport Hitch Left Vertical Frame Tube 17
18. Transport Hitch Upper Horizontal Cross Member Tube 18
19. Transport Hitch Upper Cross Member Sleeve Tube 19
20. Transport Hitch Middle Horizontal Cross Member Tube 20
21. Transport Hitch Lower Horizontal Cross Member Tube 21
22. Transport Hitch Lower Right Link Connector 22
23. Transport Hitch Upper Link Connector 23
24. Transport Hitch Lower Left Link Connector 24
25. Transport Hitch Vertical Drive Shaft 25
26. Transport Hitch Power Take-off Gear Box 26
27. Transport Hitch PTO Gear Box Vertical Power Shaft 27
28. Transport Hitch PTO Gear Box Horizontal Power Shaft 28
29. Transport Hitch Vector Bar Pivot Pin 29
30. Transport Hitch Vector Bar 30
31. Transport Hitch Main Frame Assembly 31
32. Transport Hitch Tongue Assembly 32
33. Transport Hitch 33 (General Description)
34. Transport Carrier Assembly 34
35. Transport Carrier Tongue Connecting Pin Holes 35
36. Transport Carrier Tongue Horizontal Drive Shaft 36
37. Transport Carrier Tongue Tube 37
38. Transport Carrier Tongue Vector Bar Connector 38
39. Transport Carrier Right Horizontal Frame Tube 39
40. Transport Carrier Left Horizontal Frame Tube 40
41. Transport Carrier Top Bed Plate 41
42. Transport Carrier Bottom Bed Plate 42
43. Transport Carrier Pivot Sleeve Tube 43
44. Transport Carrier Gear Box 44
45. Transport Carrier Gear Box Mounting Brackets 45
46. Transport Carrier Gear Box Horizontal Power Shaft 46
47. Transport Carrier Gear Box Vertical Power Shaft 47
48. Transport Carrier Hydraulic Steering Motor 48
49. Transport Carrier Steering Chain 49
50. Transport Carrier Vertical Drive Shaft 50
51. Transport Carrier Right Front Wedge Sleeve Tube 51
52. Transport Carrier Right Rear Wedge Sleeve Tube 52
53. Transport Carrier Left Front Wedge Sleeve Tube 53
54. Transport Carrier Left Rear Wedge Sleeve Tube 54
55. Transport Carrier Right Front Hydraulic Cylinder 55
56. Transport Carrier Right Rear Hydraulic Cylinder 56
57. Transport Carrier Left Front Hydraulic Cylinder 57
58. Transport Carrier Left Rear Hydraulic Cylinder 58
59. Transport Carrier Right Front Mounting Bracket 59
60. Transport Carrier Right Rear Mounting Bracket 60
61. Transport Carrier Left Front Mounting Bracket 61
62. Transport Carrier Left Rear Mounting Bracket 62
63. Transport Carrier Right Front Wedge Tube 63
64. Transport Carrier Right Rear Wedge Tube 64
65. Transport Carrier Left Front Wedge Tube 65
66. Transport Carrier Left Rear Wedge Tube 66
67. Transport Carrier Right Front Wedge Tube Fingers 67
68. Transport Carrier Right Rear Wedge Tube Fingers 68
69. Transport Carrier Left Front Wedge Tube Fingers 69
70. Transport Carrier Left Rear Wedge Tube Fingers 70
71. Transport Carrier Main Frame Assembly 71
72. Transport Carrier 72 (General Description)
73. Transport Trailer Assembly 73
74. Transport Trailer Lift Assembly 74
75. Transport Trailer Right Vertical Sleeve Tube 75
76. Transport Trailer Left Vertical Sleeve Tube 76
77. Transport Trailer Right Sleeve Tube Brace 77
78. Transport Trailer Left Sleeve Tube Brace 78
79. Transport Trailer Top Horizontal Support Tube 79
80. Transport Trailer Bottom Horizontal Support Tube 80
81. Transport Trailer Hydraulic Cylinder 81
82. Transport Trailer Top Horizontal Lift Tube 82
83. Transport Trailer Left Vertical Lift Tube 83
84. Transport Trailer Right Vertical Lift Tube 84
85. Transport Trailer Axle 85
86. Transport Trailer Left Wheel 86
87. Transport Trailer Right Wheel 87
88. Transport Trailer 88 (General Description)
89. Transport Turret Assembly 89
90. Transport Turret Pivot Tube 90
91. Transport Turret Pivot Tube Sprocket 91
92. Transport Turret Pivot Tube Top Collar 92
93. Transport Turret Pivot Tube Bottom Collar 93
94. Transport Turret Pivot Sleeve Tube 94
95. Transport Turret Top Bed Plate 95
96. Transport Turret Bottom Bed Plate 96
97. Transport Turret Front Support Tube 97
98. Transport Turret Back Support Tube 98
99. Transport Turret Right Support Tube 99
100. Transport Turret Left Support Tube 100
101. Transport Turret Right Interface Tube 101
102. Transport Turret Left Interface Tube 102
103. Transport Turret Right Front Wedge Sleeve Tube 103
104. Transport Turret Right Rear Wedge Sleeve Tube 104
105. Transport Turret Left Front Wedge Sleeve Tube 105
106. Transport Turret Left Rear Wedge Sleeve Tube 106
107. Transport Turret Right Front Wedge Sleeve Tube Lining 107
108. Transport Turret Right Rear Wedge Sleeve Tube Lining 108
109. Transport Turret Left Front Wedge Sleeve Tube Lining 109
110. Transport Turret Left Rear Wedge Sleeve Tube Lining 110
111. Transport Turret Right Front Pyramid Tube Expander 111
112. Transport Turret Right Rear Pyramid Tube Expander 112
113. Transport Turret Left Front Pyramid Tube Expander 113
114. Transport Turret Left Rear Pyramid Tube Expander 114
115. Transport Turret Right Front Pyramid Base Plate 115
116. Transport Turret Right Rear Pyramid Base Plate 116
117. Transport Turret Left Front Pyramid Base Plate 117
118. Transport Turret Left Rear Pyramid Base Plate 118
119. Transport Turret Gear Box 119
120. Transport Turret Gear Box Vertical Power Shaft 120
121. Transport Turret Gear Box Right Horizontal Power Shaft 121
122. Transport Turret Gear Box Left Horizontal Power Shaft 122
123. Transport Turret Gear Box Mounting Brackets 123
124. Transport Turret 124 (General Description)
125. Transport Implement 125
126. Implement Transport PLUS 126 (General Description)

Description of the Transport Hitch

Figure 1:
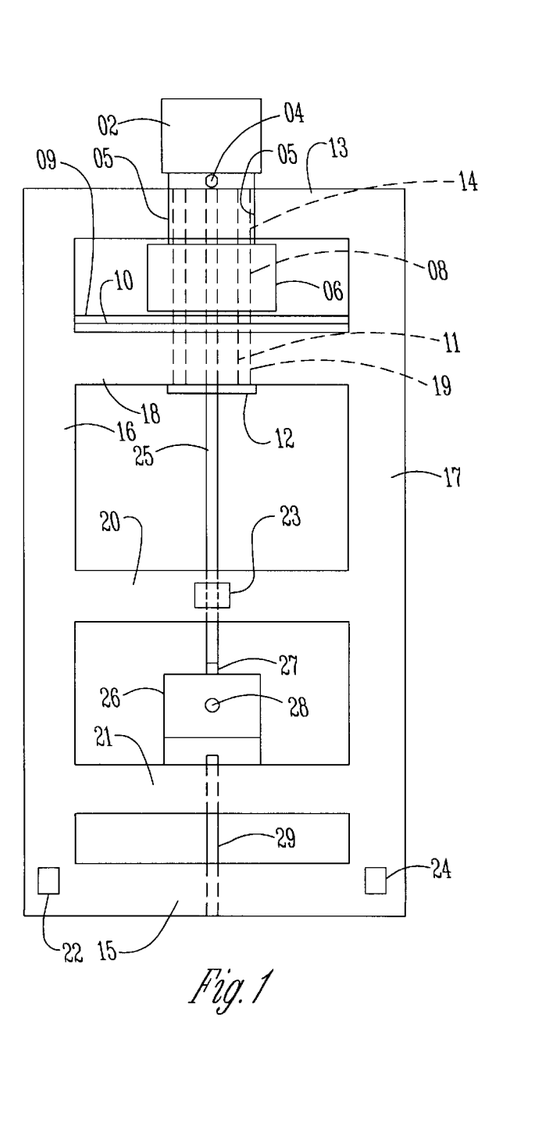
FIG. 1 is a partial front view of the Transport Hitch on an enlarged scale which schematically illustrates its components.
Figure 2:
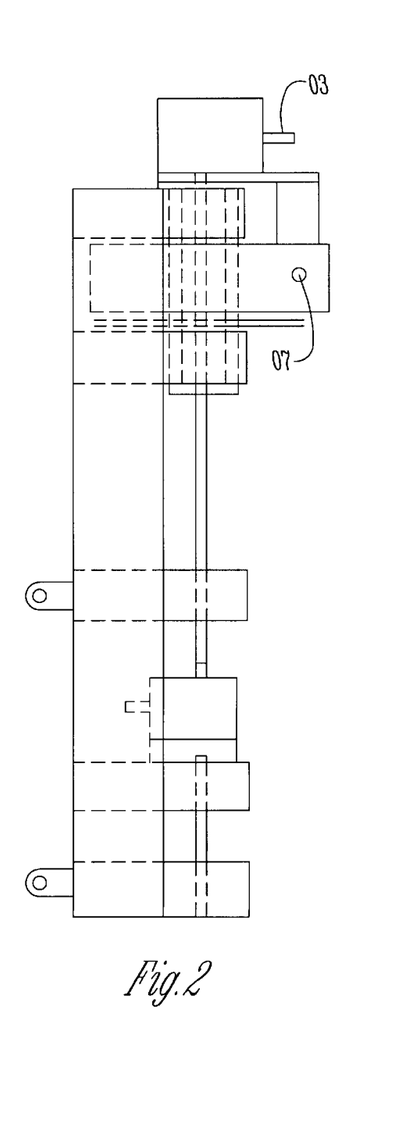
FIG. 2 is a partial left side view of FIG. 1.

The Transport Hitch Assembly 01 is illustrated in FIG. 1 and FIG. 2. The parts described in this assembly are numbered 01 thru 33. The descriptions follow in part number sequence.

The Hitch Tongue Gear Box 02 Is a right angle gear box. It receives mechanical power from the Hitch Power Take-off Gear Box 26 and transmits it to the Transport Carrier Gear Box 44. The Hitch Tongue Gear Box 02 is affixed to the Hitch Tongue Tube 06 using the Hitch Tongue Support Brackets 05. The Hitch Tongue Gear Box 02 is mounted directly above the Hitch Pivot Tube 11. The Hitch Tongue Gear Box Vertical Power Shaft 04 goes down through the center of the Hitch Pivot Tube 11. This provides a means for the Hitch Tongue Gear Box Vertical Power Shaft 04 and the Hitch Pivot Tube 11 share the same axis.

The Hitch Tongue Gear Box Horizontal Power Shaft 03 is connected to the Carrier Tongue Horizontal Drive Shaft 36 via a universal joint, and it transmits mechanical power to that Drive Shaft 36.

The Hitch Tongue Gear Box Vertical Power Shaft 04 is connected to the Hitch Vertical Drive Shaft 25, and it receives mechanical power from that Shaft 25.

The Hitch Tongue Gear Box Support Brackets 05 are affixed to the Hitch Tongue Gear Box 02 and the Hitch Tongue Tube 06 to support the Gear Box 02.

The Hitch Tongue Tube 06 is the connected to the Carrier Tongue Tube 37 using the Hitch Tongue Pivot Pin 07. The Hitch Tongue Sleeve Tube 08 is positioned vertically through the Hitch Tongue Tube 06 and affixed to it. The Hitch Tongue Sleeve Tube 08 and the Hitch Tongue Tube 06 rotate around the Hitch Pivot Tube 11 Horizontally. This pivot allows the Hitch Tongue Tube 06 to turn horizontally and follow the Hitch Main Frame Assembly 31 freely. Affixed to the bottom of Hitch Tongue Tube 06 is the Hitch Tongue Pivot Plate 09. There is and opposing plate called the Hitch Base Plate 10. Base Plate 10 is affixed to the top of the Hitch Upper Horizontal Cross Member Tube 18. The horizontal surface between the two opposing plates adds strength to and stability to the interface between the Transport Hitch Main Frame Assembly 31 and the Transport Hitch Tongue Assembly 32.

The Hitch Tongue Pivot Pin 07 connects through the Transport Carrier Tongue Connecting Pin Holes 35. This connects the Hitch Tongue Tube 06 and the Carrier Tongue Tube 37. The Hitch Tongue Pivot Pin 07 allows the Carrier Tongue Tube 37 to rotate vertically.

The Hitch Tongue Sleeve Tube 08 is positioned vertically through the Hitch Tongue Tube 06 and affixed to it. Sleeve Tube 08 rotates around the Hitch Pivot Tube 11 horizontally.

The Hitch Tongue Pivot Plate 09 is affixed to the bottom of the Hitch Tongue Tube 06. The Hitch Tongue Sleeve Tube 08 is positioned through the center of the Hitch Pivot Plate 09 and through the Hitch Tongue Tube 06 vertically and affixed to both. The Hitch Tongue Pivot Plate 09 in effect adds width to the Hitch Tongue Tube 06 and therefore adds Surface and strength to the Hitch Tongue Tube 06 to prevent sideways twisting in Tongue Tube 06.

The Hitch Cross Member Pivot Plate 10 is affixed to the top of the Hitch Upper Horizontal Cross Member 18. The Hitch Upper Cross Member Sleeve Tube 19 Passes Vertically through the Hitch Cross Member Pivot Plate 10 and through the Hitch Upper Horizontal Cross Member Tube 18. The Hitch Cross Member Pivot Plate 10 is the opposing pivot plate to the Hitch Tongue Pivot Plate 09.

The Hitch Pivot Tube 11 is inserted vertically through the Hitch Top Frame Sleeve Tube 14, the Hitch Tongue Sleeve Tube 08 and the Hitch Upper Cross Member Sleeve Tube 19. The Hitch Pivot Tube 11 is affixed to the Hitch Pivot Tube Collar 12. The Hitch Pivot Tube Collar 12 is affixed to the Hitch Upper Horizontal Cross Member Tube 18 to hold the Hitch Pivot Tube 11 in place. The Hitch Pivot Tube 11 extends above the Hitch Top Horizontal Frame Tube 13, and is part of the Hitch Tongue Gear Box Support Brackets 05.

If mechanical power is not a requirement for the Transport Implement 125 a pivot pin can be used to replace the Hitch Pivot Tube 11.

The Hitch Pivot Tube Collar 12 is affixed to the Hitch Pivot Tube 11 and to the Hitch Upper Horizontal Cross Member Tube 18 and it provides a means to insert and hold or remove the Hitch Pivot Tube 11.

The Hitch Top Horizontal Frame Tube 13 is affixed to the Hitch Right Vertical Frame Tube 16 and the Hitch Left Vertical Frame Tube 17. This Top Horizontal Frame Tube 13 is part of the Hitch Main Frame Structure 31.

The Hitch Top Frame Sleeve Tube 14 is positioned Vertically through the Top Horizontal Frame Tube 13 and affixed to the same. The Top Frame Sleeve Tube 14 provides a means to hold the top of Hitch Pivot Tube 11 in place.

The Bottom Horizontal Frame Tube 15 is affixed to the Hitch Right Vertical Frame Tube 16 and the Hitch Left Vertical Frame Tube 17. Frame Tube 15 is part of the Hitch Main Frame Structure 31.

The Hitch Right Vertical Frame Tube 16 is affixed to the Hitch Top Horizontal Frame Tube 13, the Hitch Upper Horizontal Cross Member Tube 18, the Hitch Middle Horizontal Cross Member Tube 20, the Hitch Lower Horizontal Cross Member Tube 21 and the Hitch Bottom Horizontal Frame Tube 15. This Frame Tube 16 is part of the Main Frame Structure 31.

The Hitch Left Vertical Frame Tube 17 is affixed to the Hitch Top Horizontal Frame Tube 13, the Hitch Upper Horizontal Cross Member Tube 18, the Hitch Middle Horizontal Cross Member Tube 20, the Hitch Lower Horizontal Cross Member Tube 21 and the Hitch Bottom Horizontal Frame Tube 15. This Frame Tube 17 is part of the Hitch Main Frame Structure 31.

The Hitch Upper Horizontal Cross Member Tube 18 is affixed to the Hitch Right Vertical Frame Tube 16 and the Hitch Left Vertical Frame Tube 17. This Cross Member Tube 18 is part of the Hitch Main Frame Structure 31.

The Hitch Upper Cross Member Sleeve Tube 19 is positioned vertically through the Hitch Upper Horizontal Cross Member Tube 18 and affixed to it. Sleeve Tube 18 provides a means to hold the bottom of the Hitch Pivot Tube 11 in place.

The Hitch Middle Horizontal Cross Member Tube 20 is affixed to the Hitch Right Vertical Frame Tube 16 and the Hitch Left Vertical Frame Tube 17. The Hitch Middle Horizontal Cross Member Tube 20 provides the means to affix the Hitch Upper Link Connector 23 to the Hitch Main Frame Structure 31. This Cross Member Tube 20 is part of the Hitch Main Frame Structure 31.

The Hitch Lower Horizontal Cross Member Tube 21 is affixed to the Hitch Right Vertical Frame Tube 16 and the Hitch Left Vertical Frame Tube 17. This Cross Member Tube 21 is part of the Hitch Main Frame Structure 31.

The Hitch Lower Right Link Connector 22 is affixed to the Hitch Right Vertical Frame Tube 16. The Hitch Lover Right Link Connector 22 is a standard connector for a three point hitch on a farm implement.

The Hitch Upper Link Connector 23 is affixed to the Hitch Middle Horizontal Cross Member Tube 20. The Hitch Upper Link Connector 23 is a standard connector for a three point hitch on a farm implement.

The Hitch Lower Left Link Connector 24 is affixed to the Hitch Left Vertical Frame Tube 17. The Hitch Lower Left Link Connector 24 is a standard connector for a three point hitch on a farm implement.

The Hitch Vertical Drive Shaft 25 is connected to the Hitch PTO Gear Box Vertical Power Shaft 27 and the Hitch Tongue Gear Box Vertical Power Shaft 04. Where in is provided a means to transmit mechanical power from the Hitch PTO Gear Box 26 to the Hitch Tongue Gear Box 02.

The Hitch PTO Gear Box 26 is a right angle gear box that receives mechanical power from a tractor power take off shaft and transmits that power to the Hitch Tongue Gear Box 02. The Hitch PTO Gear Box 26 is affixed to the Hitch Lower Horizontal Cross Member Tube 21.

The Hitch PTO Vertical Power Shaft 27 connects to the Hitch Vertical Drive Shaft 25. Mechanical power is transmitted through that shaft to the Hitch Tower Gear Box 02.

The Hitch PTO Gear Box Horizontal Power Shaft 28 is connected to a tractors power take off shaft and receives mechanical power from that shaft.

The Hitch Vector Bar Pivot Pin 29 is affixed to the Hitch Lower Horizontal Cross Member Tube 21 and the Hitch Bottom Horizontal Frame Tube 15. The Hitch Vector Bar Pivot pin 29 is located on the same axis as the Hitch Pivot Tube 11. This provides a means for the Hitch Vector Bar 30 to rotate Horizontally on the same axis as the Hitch Pivot Tube 11.

The Hitch Vector Bar 30 connects to the Hitch Vector Bar Pivot Pin 29 and the Carrier Tongue Vector Bar Connector 38. The Vector Bar 30 provides a means to distribute the energy of the pull more evenly through the Transport Hitch.

The Hitch Main Frame Assembly 31 is made up of seven parts affixed together, they are the Hitch Top Horizontal Frame Tube 13, The Hitch Bottom Horizontal Frame Tube 15, the Hitch Right Vertical Frame Tube 16, the Hitch Left Vertical Frame Tube 17, the Hitch Upper Horizontal Cross Member Tube 18, the Hitch Middle Horizontal Cross Member Tube 20, and the Hitch Lower Horizontal Cross Member Tube 21. This framework is the primary support structure of the Transport Hitch. The forces received from the tractors three point hitch, the Carrier Tongue Tube 37, the Hitch Vector Bar 30 and the Hitch Tongue Tube 06 are distributed and counteracted through the Hitch Main Frame Structure 31.

The Hitch Tongue Assembly 32 consist of eight descriptive parts, they are the Hitch Tongue Gear Box 02, the Hitch Tongue Gear Box Horizontal Power shaft 03, the Hitch Tongue Gear Box Vertical Power Shaft 04, the Hitch Tongue Gear Box Support Brackets 05, the Hitch Tongue Tube 06, the Hitch Tongue Pivot Pin 07, the Hitch Tongue Sleeve Tube 08, and the Hitch Tongue Pivot Plate 09. All these components are directly or indirectly affixed to the Hitch Tongue Tube 06. The Hitch Tongue Tube 06 and these parts rotate around Hitch Pivot tube 11 via the Hitch Tongue Sleeve Tube 08. The Hitch Tongue Assembly 32 is functionally and extension of the Carrier Tongue Tube 37. The Hitch Tongue Assembly 32 provides the means for Horizontal rotation around the Hitch Pivot Tube 11 and vertical rotation around Hitch Tongue Pivot Pin 07. These Pivot functions were incorporated into the Transport Hitch to provide the ridged control and the strength needed in this invention.

Transport Hitch 33 (General Description)

The Transport Hitch FIG. 01 and 02 is designed to hook up to a farm tractors three point hitch and power take-off. The Transport Hitch is also designed to match and support the height of the Transport Carrier Tongue Tube 37. This is accomplished by two assemblies of parts in the Transport Hitch, they are the Hitch Frame Assembly 31 and the Hitch Tongue Assembly 32. The Hitch Main Frame Assembly 31 is the primary support structure of the Transport Hitch.

The pulling forces from the tractors three point hitch on the tractors side of the Transport Hitch and the Hitch Vector Bar 30 and the Carrier Tongue Tube 37 on the Transport side of the Transport Hitch are distributed and counter acted through the framework structure of the Hitch Frame Assembly 31. The Hitch Tongue Assembly 32 provides horizontal rotation around the Hitch Pivot Tube 11 and vertical rotation around the Hitch Tongue Pivot Pin 07. Both of these pivots are heavy duty to provide the strength and stability needed at the Hitch Tongue Tube 06 connections.

A unique characteristic of the Transport Hitch is that the mechanical power from the tractors power take off unit is routed through the center of the Hitch Pivot Tube 11. This provides that the Hitch Vertical Power Shaft 25. shares the same axis as the Hitch Pivot Tube 11. The tractor can turn a 90 degree corner and the Hitch Tongue Assembly 32 rotates horizontally with the Transport Carrier Tongue Tube 37, since the Hitch Tongue Gear Box Vertical Power Shaft 04 is centered over the Hitch Pivot Tube 11 they stay on the same axis as the tractor and Transport make a turn. The alignment of the Hitch Tongue Gear Box Vertical Power Shaft 04, the Hitch Vertical Power Shaft 25 and the Hitch PTO Gear Box Vertical Power Shaft 27 is accomplished by the use of two right angle gear boxes, the Hitch Tongue Gear Box 02 and the Hitch Power Take Off Gear Box 26, Their vertical power shafts are centered through the Hitch Pivot Tube 11. The Hitch PTO Gear Box Horizontal Power Shaft 28 points directly to the tractor power take off (PTO) and the Hitch Tongue Gear Box Horizontal Power Shaft 03 points directly to the Carrier Tongue Tube 37.

The Hitch Power Take Off Gear Box 26 receives power from the tractor power take off. The Hitch Power Take Off Gear Box 26 is affixed to the Hitch Lower Horizontal Cross Member Tube 21 which is part of the Hitch Main Frame Assembly 31. The Hitch Main Frame Assembly 31 is connected to the tractor by the standard three point hitch hookup. When the Transport Hitch is connected to the three point hitch the Hitch Main Frame Assembly 31 and the Hitch Power Take Off Gear Box 26 are stationary to the tractor. The Hitch PTO Gear Box Horizontal Power Shaft 28 points directly to the tractor power take off and is connected to it. The Hitch Vertical Power Take Off Shaft 27 points directly to the center of the Hitch Pivot Tube 11 and is connected to the Hitch Vertical Power Shaft 25 via the Hitch Vertical Drive Shaft 25, through the Hitch Pivot Tube 11.

The Hitch Tongue Gear Box 02 is affixed to the Hitch Tongue Tube 06 via Hitch Tongue Gear Box Support Brackets 05. The Hitch Tongue Gear Box 02 is mounted so the Hitch Tongue Gear Box Vertical Power Shaft 04 points directly to the center of the Hitch Pivot Tube 11 and it is connected to the Hitch Vertical Power Shaft 25 through the Hitch Pivot Tube 11. The Hitch Tongue Gear Box 02 is also mounted so that the Hitch Tongue Gear Box Horizontal Power Shaft 03 Points directly toward the Hitch Tongue Pivot Pin 07 connection. The Hitch Tongue Gear Box Horizontal Power Shaft 03 connects to the Transport Carrier Tongue Horizontal Drive Shaft 36 via a standard universal joint directly over the Hitch Tongue Pivot Pin 07. The vertical pivot motion in the Hitch Tongue Pivot Pin 07 connection is minimal and is paralleled by a universal joint.

Since the Hitch Tongue Gear Box 02 is affixed to the Hitch Tongue Tube 06 it rotates with the Hitch Tongue Tube 06. The effect is the Hitch Tongue Gear Box 02 rotates on the Hitch Tongue Gear Box Vertical Power Shaft 04 during horizontal turns of the tractor and Transport 126. By using two right angle gear boxes, the Hitch Tongue Gear Box 02 and the Hitch Power Take Off Gear Box 26, the Hitch Tongue Gear Box Vertical Power Shaft 04 and the Hitch PTO Gear Box Vertical Power Shaft 27 rotate on the same axis as the Hitch Pivot Tube 11. This creates a very efficient and harmonious transfer of mechanical power from the tractor through the Transport Hitch 01.

Description of the Transport Carrier

Figure 5:
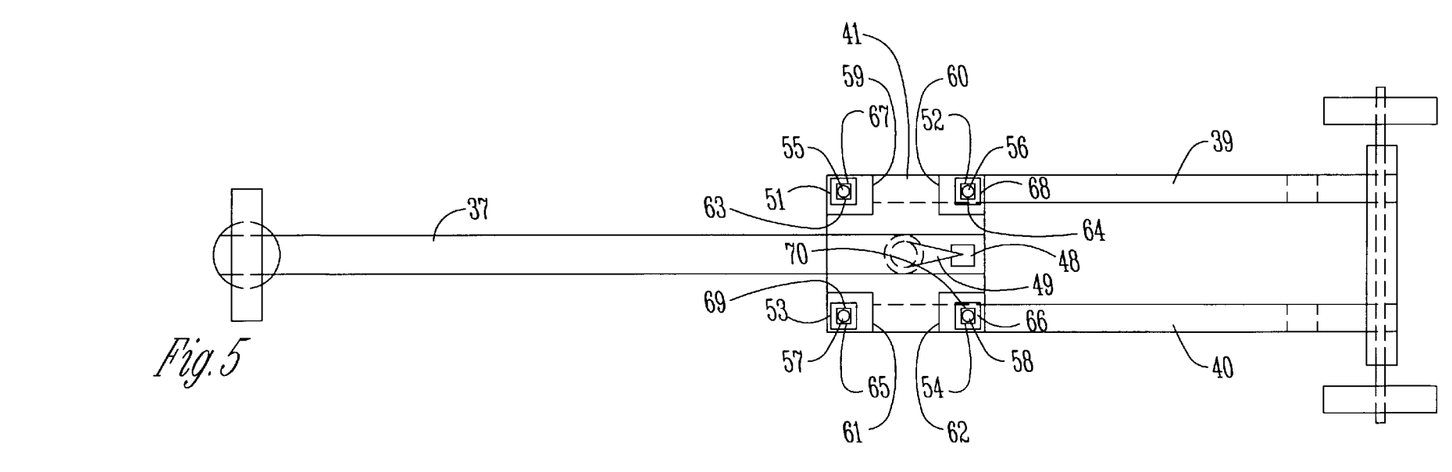
FIG. 5 is a partial top view of the Transport Carrier schematically illustrating the arrangement of its components.
Figure 6:
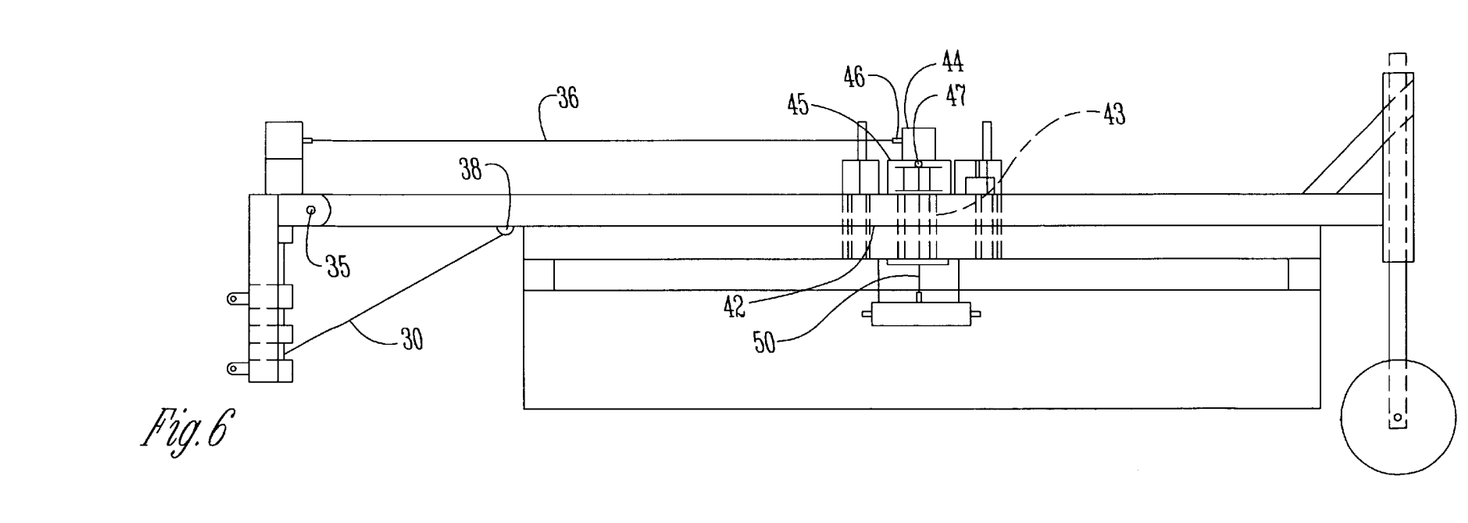
FIG. 6 is a partial left side view of the present invention in transport mode schematically illustrating the arrangement of its components.
Figure 7:
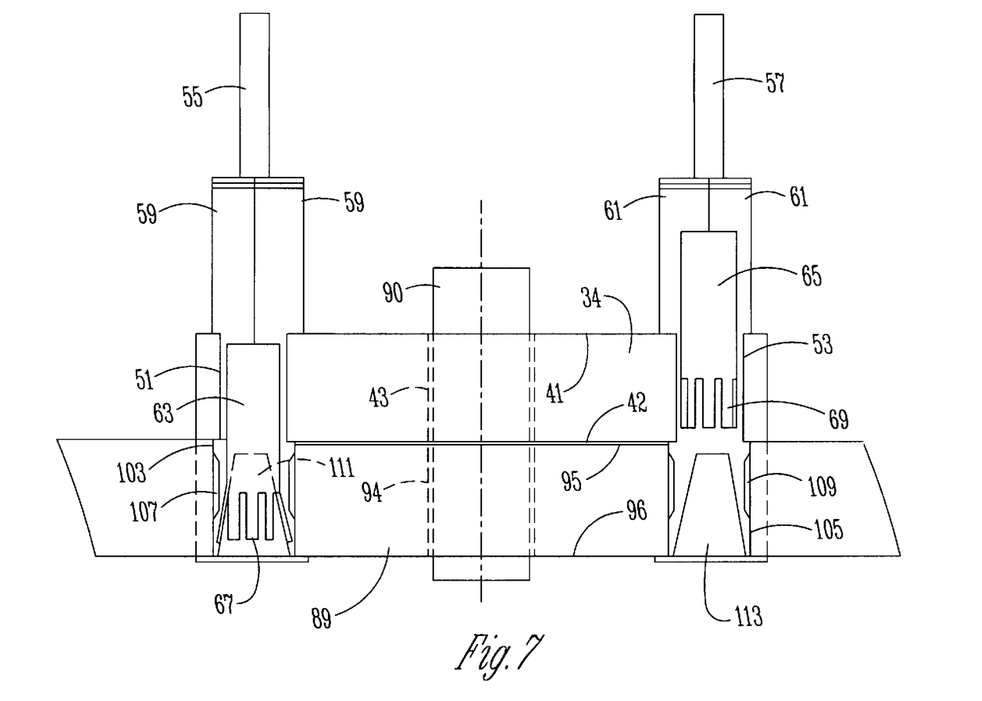
FIG. 7 is an enlarged front segmented cutaway view of the Transport Carrier and the Transport Turret schematically illustrating the arrangement of their components.

The Transport Carrier Assembly 34 is illustrated in FIG. 5, FIG. 6 and FIG. 7. The parts described in this assembly are numbered 34 thru 72. The descriptions follow in part number sequence.

The Carrier Tongue Connecting Pin Holes 35 are arranged to insert the Hitch Tongue Pivot Pin 07 through, this connects the Hitch Tongue Tube 06 and the Carrier Tongue Tube 37.

The Carrier Tongue Horizontal Drive Shaft 36 connects to the Hitch Tongue Gear Box Horizontal Power Shaft 03, by way of a universal joint. The Carrier Tongue Horizontal Drive Shaft 36 receives mechanical power from the Hitch Tongue Gear Box Horizontal Power Shaft 03 through a universal joint connection. The Carrier Tongue Horizontal Drive Shaft 36 also connects to the Carrier Gear Box Horizontal Power Shaft 46.

The Carrier Tongue Tube 37 is connected to the Hitch Tongue Tube 06 by inserting the Hitch Tongue Pivot Pin 07 through the Carrier Tongue Connecting Pin Holes 35. The Carrier Tongue Tube 37 is affixed to the Carrier Top Bed Plate 41 and the Carrier Bottom Bed Plate 42. The Carrier Pivot Sleeve Tube 43 is positioned vertically through the Carrier Top Bed Plate 41, the Carrier Tongue Tube 37 and the Carrier Bottom Bed Plate 42. The Turret Pivot Tube 90 rotates inside the Carrier Pivot Sleeve Tube 43.

The Carrier Tongue Vector Bar Connector 38 is affixed to the Carrier Tongue tube 37. It provides a means to connect the Hitch Vector Bar 30 to the Carrier Tongue Tube 37.

The Carrier Right Horizontal Frame Tube 39 is made out of rectangular tubing. The leading or front end of Frame Tube 39 is affixed to the Carrier Top Bed Plate 41 and the Carrier Bottom Bed Plate 42. The trailing or back end of Frame Tube 39 is affixed to the Trailer Right Vertical Sleeve Tube 75, the Trailer Right Sleeve Tube Brace 77 and the Trailer Bottom Horizontal Support Tube 80.

The Carrier Left Horizontal Frame Tube 40 is made out of rectangular tubing. The leading or front end of Frame Tube 40 is affixed to the Carrier Top Bed Plate 41 and the Carrier Bottom Bed Plate 42. The trailing or back end of Frame Tube 40 is affixed to the Trailer Left Vertical Sleeve Tube Brace 78 and the Trailer Bottom Horizontal Support Tube 80.

The Carrier Top Plate 41 is affixed to the top of the Carrier Tongue Tube 37, to the top of the Carrier Right Horizontal Frame Tube 39 and the top of the Carrier Left Horizontal Frame Tube 40.

The Carrier Bottom Plate 42 is affixed to the bottom of the Carrier Tongue Tube 37, to the bottom of the Carrier Right Horizontal Frame Tube 39 and the Bottom of the Carrier Left Horizontal Frame Tube 40.

The Carrier Pivot Sleeve Tube 43 is positioned vertically through the center of the Carrier Top Plate 41, through the Carrier Tongue Tube 37 and through the center of the Carrier Bottom Plate 42, and affixed to all three. The Turret Pivot Tube 90 rotates inside the Carrier Pivot Sleeve Tube 43.

The Carrier Gear Box 44 is a right angle gear box. It receives power from the Hitch Tongue Gear Box 02 through the Carrier Tongue Horizontal Drive Shaft 36. The Carrier Gear Box 44 is affixed to the Carrier Top Plate 41 by the Carrier Gear Box Mounting Brackets 45. The Carrier Gear Box 44 is mounted directly above the Turret Pivot Tube 90. The Carrier Gear Box Vertical Power Shaft 47 points directly down through the center of the Turret Pivot Tube 90. The Carrier Gear Box Vertical Power Shaft 47 and the Turret Pivot Tube 90 rotate on the same axis.

The Carrier Gear Box Mounting Brackets 45 are affixed to the Carrier Top Plate 41 and the Carrier Gear Box 44, to support the Carrier Gear Box 44.

The Carrier Gear Box Horizontal Drive Shaft 46 is connected to the Carrier Tongue Horizontal Drive Shaft 36 and it receives mechanical power through that Shaft 36.

The Carrier Gear Box Vertical Power Shaft 47 is connected to the Carrier Vertical Drive Shaft 50, and it transmits power to that Shaft 50.

Figure 10:
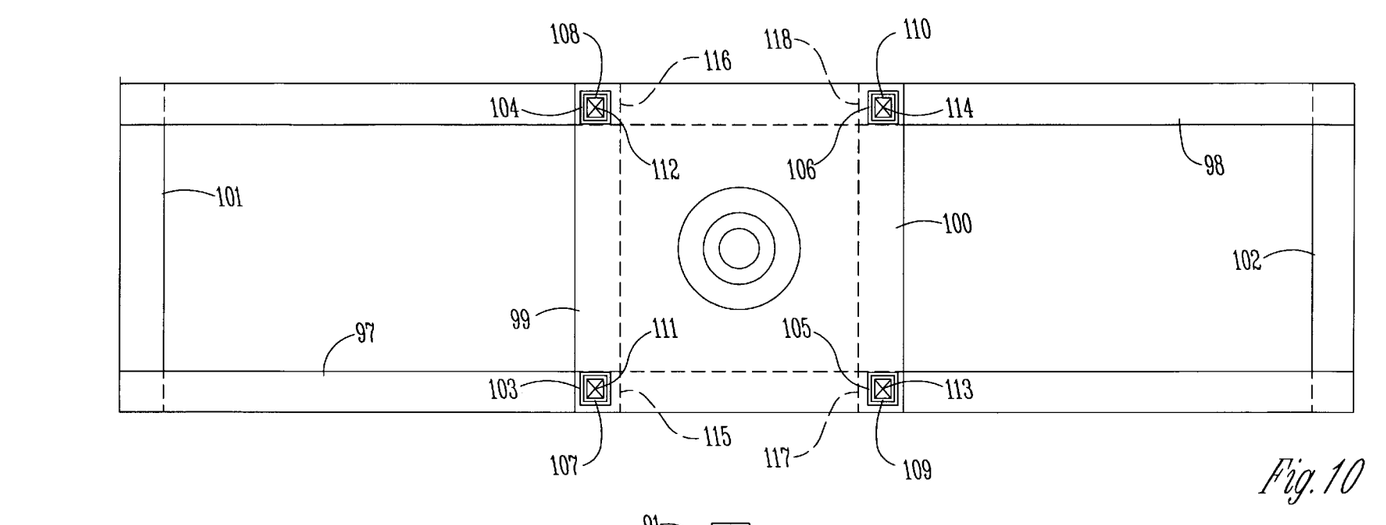
FIG. 10 is a partial top view of the Transport Turret schematically illustrating the arrangement of its components.
Figure 11:
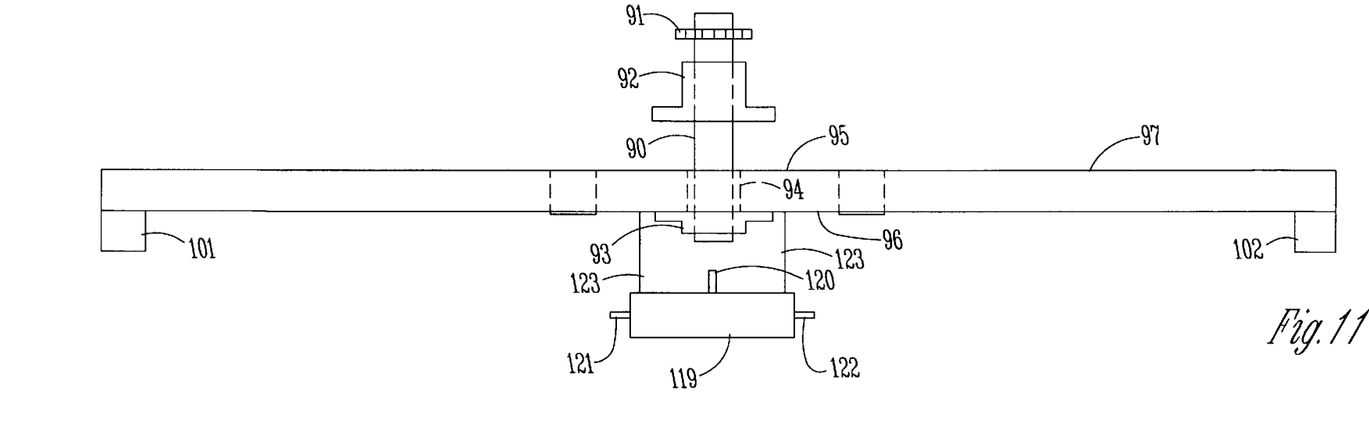
FIG. 11 is a partial front view of FIG. 10.

The Carrier Hydraulic Steering Motor 48 is affixed to the Carrier Top Plate 41. The Carrier Hydraulic Steering Motor 48 is Connected to the Turret Pivot Tube Sprocket 91 FIG. 11 by way of the Carrier Steering Chain 49. The Carrier Hydraulic Steering Motor 48 is a bidirectional hydraulic motor, it receives power through hydraulic hoses that are connected to a tractors hydraulic system. A lever is manipulated by the tractor operator to activate the Carrier Hydraulic Steering Motor 48 to run in the desired direction, which turns the Turret Pivot Tube 90 FIG. 11. by way of the Carrier Steering Chain 49 and the Turret Pivot Tube Sprocket 91 FIG. 11. The Turret Assembly 89 FIG. 10 and 11 is affixed to the Turret Pivot Tube 90 and therefore the Carrier Hydraulic Steering Motor 48 is used to rotate the Turret Assembly 89.

The Carrier Vertical Drive Shaft 50 is connected to the Carrier Gear Box Vertical Power Shaft 47 and it receives power from that Shaft 47. The Carrier Vertical Drive Shaft 50 is also connected to the Turret Gear Box Vertical Power Shaft 120 FIG. 11, and shaft 50 transmits power to that Shaft 120.

The Carrier Right Front Wedge Sleeve Tube 51 is made out of square tubing. The Carrier Right Front Wedge Sleeve Tube 51 is positioned vertically through the Carrier Top Bed Plate 41, the Carrier Right Horizontal Frame Tube 39 and the Carrier Bottom Bed Plate 42, and affixed to all three.

The Carrier Right Rear Wedge Sleeve Tube 52 is made out of square tubing. The Carrier Right Rear Wedge Sleeve Tube 52 is positioned vertically through the Carrier Top Bed Plate 41, the Carrier Right Horizontal Frame Tube 39 and the Carrier Bottom Bed Plate 42, and affixed to all three.

The Carrier Left Front Wedge Sleeve Tube 53 is made out of square tubing. The Carrier Left Front Wedge Sleeve Tube 53 is positioned vertically through the Carrier Top Bed Plate 41, the Carrier Left Horizontal Frame Tube 40 and the Carrier Bottom Bed Plate 42, and affixed to all three.

The Carrier Left Rear Wedge Sleeve Tube 54 is made out of square tubing. The Carrier Left Rear Wedge Sleeve Tube 54 is positioned vertically through the Carrier Top Bed Plate 41, the Carrier Left Horizontal Frame Tube 40 and the Carrier Bottom Bed Plate 42, and affixed to all three.

The Carrier Right Front Hydraulic Cylinder 55 is a two-way hydraulic cylinder it is powered by the hydraulic system of a farm tractor. This Hydraulic Cylinder 55 is activated by the tractor operator using a hand control. The Carrier Right Front Hydraulic Cylinder 55 inserts and extracts the Carrier Right Front Wedge Tube 63 through the Carrier Right Front Wedge Sleeve Tube 51 and through the Turret Right Front Wedge Sleeve Tube 103 and into and out of the Turret Right Front Tube Expander 111. The Carrier Right Front Hydraulic Cylinder 55 operates in parallel with Cylinder 56, Cylinder 57 and Cylinder 58.

The Carrier Right Rear Hydraulic Cylinder 56 is a two-way hydraulic cylinder, it is powered by the hydraulic system of a farm tractor. This Hydraulic Cylinder 56 is activated by the tractor operator using a hand control. The Carrier Right Rear Hydraulic Cylinder 56 inserts and extracts the Carrier Right Rear Wedge Tube 64 through the Carrier Right Rear Wedge Sleeve Tube 52 and through the Turret Right Rear Wedge Sleeve Tube 104 and into and out of the Turret Right Rear Tube Expander 112. The Carrier Right Rear Hydraulic Cylinder 56 operates in parallel with Cylinder 55, Cylinder 57 and Cylinder 58.

The Carrier Left Front Hydraulic Cylinder 57 is a two-way hydraulic cylinder, it is powered by the hydraulic system of a farm tractor. This Hydraulic Cylinder 57 is activated by the tractor operator using a hand control. The Carrier Left Front Hydraulic Cylinder 57 inserts and extracts the Carrier Left Front Wedge Tube 65 through the Carrier Left Front Wedge Sleeve Tube 53 and through the Turret Left Front Wedge Sleeve Tube 105 and into and out of the Turret Left Front Tube Expander 113. The Carrier Left Front Hydraulic Cylinder 57 operates in parallel with Cylinder 55, Cylinder 56 and Cylinder 58.

The Carrier Left Rear Hydraulic Cylinder 58 is a two-way hydraulic cylinder, it is powered by the hydraulic system of a farm tractor. This Hydraulic Cylinder 58 is activated by the tractor operator using a hand control. The Carrier Left Rear Hydraulic cylinder 58 inserts and extracts the Carrier Left Rear Wedge Tube 66 through the Carrier Left Rear Wedge Sleeve Tube 54 and through the Turret Left Rear Wedge Sleeve Tube 106 and into and out of the Turret Left Rear Tube Expander 114. The Carrier Left Rear Hydraulic Cylinder 58 operates in parallel with Cylinder 55, Cylinder 56 and Cylinder 57.

The Carrier Right Front Mounting Bracket 59 is affixed to the Carrier Right Front Hydraulic Cylinder 55 and to the Carrier Top Plate 41 to support the Cylinder 55.

The Carrier Right Rear Mounting Bracket 60 is affixed to the Carrier Right Rear Hydraulic Cylinder 56 and to the Carrier Top Plate 41 To support the Cylinder 56.

The Carrier Left Front Mounting Bracket 61 is affixed to the Carrier Left Front Hydraulic Cylinder 57 and to the Carrier Top Plate 41 To support the cylinder 57.

The Carrier Left Rear Mounting Bracket 62 is affixed to the Carrier Left Rear Hydraulic Cylinder 58 and to the Carrier Top Plate 41 to support the Cylinder 58.

The Carrier Right Front Wedge Tube 63 is made out of square tubing. The Carrier Right Front Hydraulic Cylinder 55 is connected to the top end of the Wedge Tube 63. The opposite end of the wedge Tube 63 contains the Carrier Right Front Wedge Tube Fingers 67.

The Carrier Right Rear Wedge Tube 64 is made out of square tubing. The Carrier Right rear Hydraulic Cylinder 56 is connected to the top end of the Wedge Tube 64. The opposite end of the Wedge Tube 64 contains the Carrier Right Rear Wedge Tube Fingers 68.

The Carrier Left Front Wedge Tube 65 is made out of square tubing. The Carrier Left Front Hydraulic Cylinder 57 is connected to top end of the Wedge Tube 65. The opposite end of the Wedge Tube 65 contains the Carrier left Front Wedge Tube Fingers 69.

The Carrier Left Rear Wedge Tube 66 is made out of square tubing. The Carrier Left Rear Hydraulic cylinder 58 is connected to the top end of the Wedge Tube 66. The opposite end of the wedge Tube 66 contains the Carrier Left Rear Wedge Tube Fingers 70.

The Carrier Right Front Wedge Tube Fingers 67 are created by cutting slits lengthwise into the leading end of the Carrier Right Front Wedge Tube 63. The Fingers 67 are cut into all four sides of the Wedge Tube 63.

The Carrier Right Rear Wedge Tube Fingers 68 are created by cutting slits lengthwise into the leading end of the Carrier Right Rear Wedge Tube 64. The Fingers 68 are cut into all four sides of the Wedge Tube 64.

The Carrier Left Front Wedge Tube Fingers 69 are created by cutting slits lengthwise into the leading end of the Carrier Left Front Wedge Tube 65. The Fingers 69 are cut into all four sides of the Wedge Tube 65.

The Carrier Left Rear Wedge Tube Fingers 70 are created by cutting slits lengthwise into the leading end of the Carrier Left Rear Wedge Tube 66. The Fingers 70 are cut into all four sides of the Wedge Tube 66.

The Carrier Main Frame Assembly 71 consists of the following parts that are affixed together. The Carrier Tongue Tube 37, the Carrier Right Horizontal Frame Tube 39, the Carrier Left Horizontal Frame Tube 40, the Carrier Top Plate 41, the Carrier Bottom Plate 42, the Carrier Pivot Sleeve Tube 43, the Carrier Right Front Wedge Sleeve Tube 51, the Carrier Right Rear Wedge Sleeve Tube 52, the Carrier Left Front Wedge Sleeve Tube 53 and the Carrier Left Rear Wedge Sleeve Tube 54.

Transport Carrier 72 (General Description)

Figure 3:
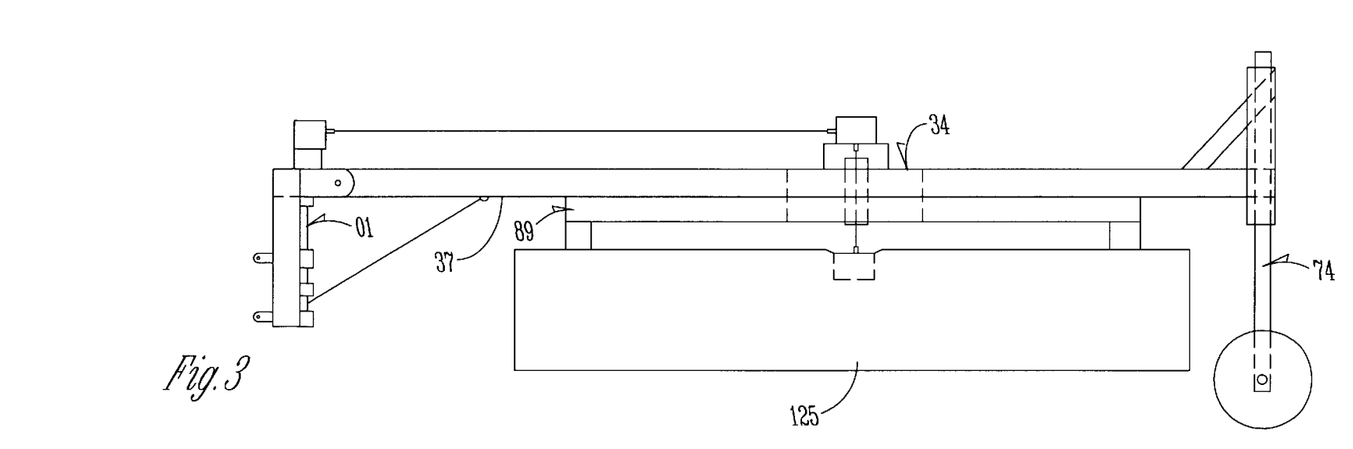
FIG. 3 is a partial left side view schematically illustrating the present invention in transport mode, the Trailer Lift Assembly 74 is down and ground engaging, the Transport Implement 125 is rotated so its long side is parallel to the Transport Carrier Tongue 37.
Figure 4:
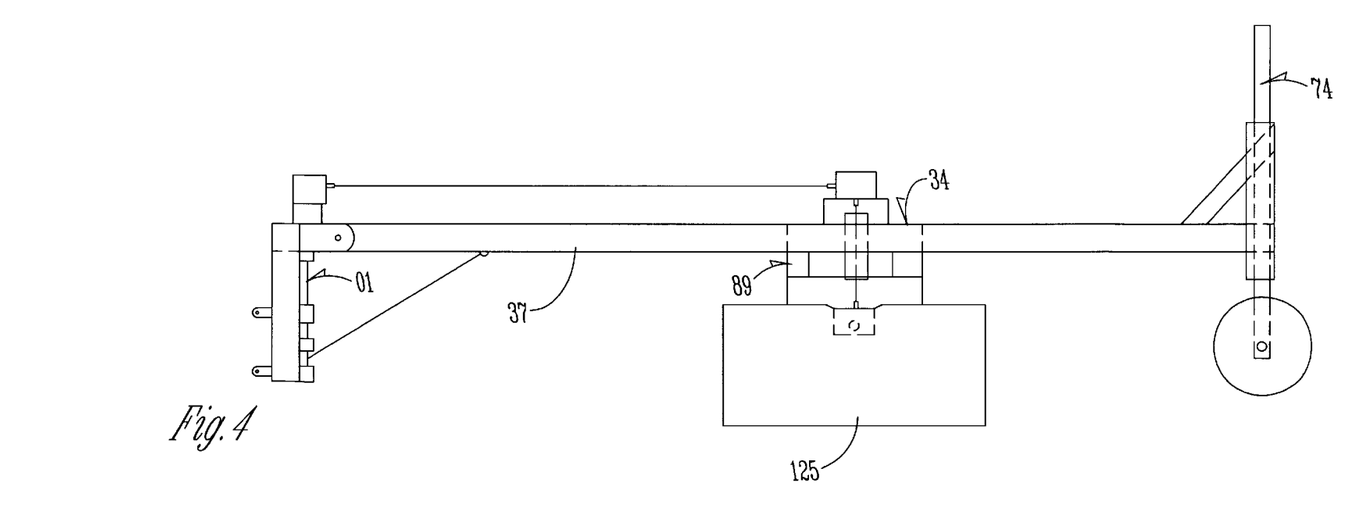
FIG. 4 is a partial left side view schematically illustrating the present invention in working mode, the Implement 125 is rotated to working position, the Trailer Lift Assembly 74 is up and the Implement 125 is ground engaging.

The Transport Carrier Assembly 34 is designed to carry the Transport Turret Assembly 89 and the Implement 125 which is attached to the Turret Assembly 89. The Transport Carrier Assembly 34 is the interface mechanism and supports the activity of the Transport Hitch Assembly 01 and the Transport Trailer Assembly 74. The Transport Carrier Main Frame Assembly 71 is the primary support structure of the Transport Carrier Assembly 34. There are two major forces distributed through the Carrier Main Frame Assembly 71. When the Implement 125 is being transported as shown in FIG. 3 there is the weight of the Transport Turret Assembly 89 and the weight of the Implement 125 pulling down on the Carrier Main Frame Assembly 71. When the Implement 125 is ground engaged as shown in FIG. 4 there is the resistance of the Implement 125 being pulled forward.

The Transport Carrier Assembly 34 also provides for horizontal rotation of the Turret Assembly 89 and Implement 125. To transport Implement 125 the Turret Assembly 89 is rotated with the narrow side of Implement 125 parallel to the Carrier Tongue 37, as shown in FIG. 3. For ground engaging work the Implement 125 is rotated narrow side perpendicular to the Carrier Tongue 37, as shown in FIG. 4. The rotation of the Transport Turret Assembly 89 takes place at the Transport Turret Pivot Tube 90 FIG. 11 and the Carrier Pivot Sleeve Tube 43. The Pivot Tube 90 is positioned inside the Carrier Pivot Sleeve Tube 43. The Pivot Tube 90 extends above the Carrier Top Plate 41. The Turret Pivot Tube Top Collar 92 FIG. 11 holds the Carrier Assembly 34 and the Turret Assembly 89 together during Turret 89 rotation. Affixed to the top of Pivot Tube 90 is the Transport Pivot Tube Sprocket 91. Mounted on the Carrier Top Bed Plate 41 is the Carrier Hydraulic Steering Motor 48. The Hydraulic Steering motor 48 is connected to the Transport Pivot Tube Sprocket 91 by the Carrier Steering Chain 49. The Steering Motor 48 is a bi-directional motor that is powered by a tractor hydraulic system. The Steering Motor 48 is controlled by the tractor operator using a tractor hand control. With the Transport Trailer Assembly 74 in down position and the Carrier Wedge Tubes 63, 64, 65 and 66 in retracted position. The operator can rotate the Turret Assembly 89 and Implement 125 to the desired position, parallel to the Tongue 37 as illustrated in FIG. 3, for transport, or perpendicular to the Tongue 37 as illustrated in FIG. 4, for working position. When the Turret Assembly 89 is rotated to the desired position the Carrier Wedge Tubes 63, 64, 65 and 66 are inserted thru the Turret Wedge Sleeve Tubes 103, 104, 105 and 106 into the Turret Pyramid Tube Expanders 111, 112, 113 and 114. The Wedge Tube Fingers 67, 68, 69 and 70 are forced outward against the Turret Wedge Sleeve Tube Linings 107, 108, 109 and 110. When the Carrier Wedge Tubes 63, 64, 65, and 66 are fully inserted into the Turret Pyramid Tube Expanders 111, 112, 113 and 114 the Transport Carrier Assembly 34 and the Transport Turret Assembly 89 are affixed together in five places. The Carrier Assembly 34 and the Turret Assembly 89 are affixed at the Transport Pivot Tube 90, the Carrier Right Front Wedge Tube 63, the Carrier Right Rear Wedge Tube 64, the Carrier Left Front Wedge Tube 65 and the Carrier Left Rear Wedge Tube 66. The Carrier Wedge Tubes 63, 64, 65 and 66 are inserted and wedged in when Implement 125 is in transport position or working position. The Carrier Wedge Tubes 63, 64, 65 and 66 provide resistance to both vertical forces and horizontal forces created between the Transport Carrier Assembly 34 and the Transport Turret Assembly 89.

Description of the Transport Trailer

The Transport Trailer Assembly 73 is illustrated is FIG. 3, FIG. 4, FIG. 8 and FIG. 9. The parts described in this assembly are numbered 73 thru 88. The descriptions follow in part number sequence.

Figure 8:
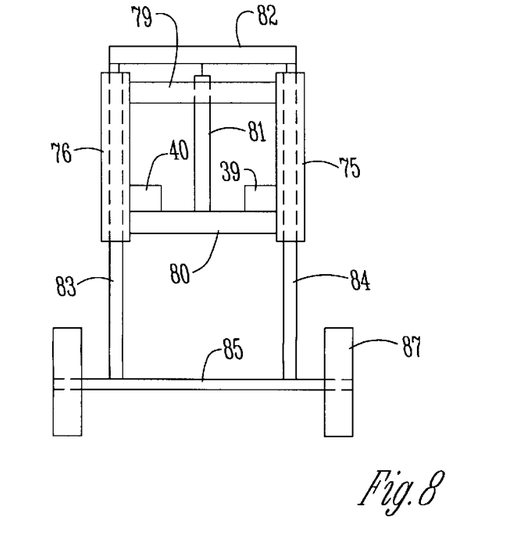
FIG. 8 is a partial rear view of the Transport Trailer schematically illustrating the arrangement of its components.
Figure 9:
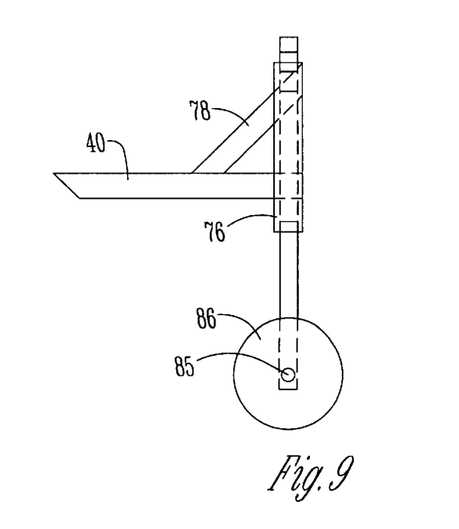
FIG. 9 is a left side segmented view of FIG. 8.

The Transport Trailer Lift Assembly 74 is made up of six parts affixed together, they are the Trailer Top Horizontal Lift Tube 82, the Trailer Left Vertical Lift Tube 83, The Trailer Right Vertical Lift Tube 84, the Trailer Axle 85, the Trailer Left Wheel 86 and the Trailer Right Wheel 87.

The Trailer Right Vertical Sleeve Tube 75 is made out of rectangular tubing. The Trailer Right Vertical Sleeve Tube 75 is affixed to Carrier Right Horizontal Frame Tube 39, the Trailer Top Horizontal Support Tube 79, the Trailer Bottom Horizontal Support Tube 80 and the Trailer Right Sleeve Tube Brace 77. The Trailer Right Vertical Lift Tube 84 passes through Vertical Sleeve Tube 75.

The Trailer Left Vertical Sleeve Tube 76 is made out of rectangular tubing. The Left Vertical Sleeve Tube 76 is affixed to the Carrier Left Horizontal Frame Tube 40, the Trailer Top Horizontal Support Tube 79, the Trailer Bottom Horizontal Support Tube 80 and the Trailer Left Sleeve Tube Brace 78. The Trailer Left Vertical Lift Tube 83 passes through the Trailer Vertical Sleeve Tube 76.

The Trailer Right Sleeve Tube Brace 77 is affixed to the Carrier Right Horizontal Frame Tube 39 and the Trailer Right Vertical Sleeve Tube 75. The Sleeve Tube Brace 77 provides support for the Trailer Right Vertical Sleeve Tube 75.

The Trailer Left Sleeve Tube Brace 78 is affixed to the Carrier Left Horizontal Frame Tube 40 and the Trailer Left Vertical Sleeve Tube 76. The Sleeve Tube Brace 78 provides support for the Trailer Left Vertical Sleeve Tube 76.

The Trailer Top Horizontal Support Tube 79 is affixed to the Trailer Right Vertical Sleeve Tube 75 and to the Trailer Left Vertical Sleeve Tube 76. The Trailer Hydraulic Cylinder 81 is positioned vertically through the middle of the Trailer Top Horizontal Support Tube 79 and affixed to it. The Hydraulic Cylinder 81 is connected to the Trailer Top Horizontal Lift Tube 82.

The Trailer Bottom Horizontal Support Tube 80 is affixed to the Carrier Right Horizontal Frame Tube 39, the Carrier Left Horizontal Frame Tube 40, the Trailer Right Vertical Sleeve Tube 75, the Trailer Left Vertical Sleeve Tube 76 and the Trailer Hydraulic Cylinder 81.

The Trailer Hydraulic Cylinder 81 is affixed to the Trailer Top Horizontal Support Tube 79 and the Trailer Bottom Horizontal Support Tube 80. The Hydraulic Cylinder 81 is connected to the Trailer Top Horizontal Lift Tube 82. When Hydraulic Cylinder 81 is extended and retracted it lovers and raises the Transport.

The Trailer Top Horizontal Lift Tube 82 is constructed using rectangular tubing. Lift Tube 82 is affixed to the Trailer Right Vertical Lift Tube 84 and the Trailer Left Vertical Lift Tube 83. The Trailer Hydraulic Cylinder 81 is connected to Lift Tube 82.

The Trailer Left Vertical Lift Tube 83 is constructed using rectangular tubing. The Vertical Lift Tube 83 is inserted vertically through the Trailer Left Vertical Sleeve Tube 76. The Vertical Lift Tube 83 travels through Vertical Sleeve Tube 76 when the Transport 126 is raised or lowered.

The Trailer Right Vertical Lift 84 is constructed using rectangular tubing. The Vertical Lift Tube 84 is inserted vertically through the Trailer Right Vertical Sleeve Tube 75. The Right Vertical Lift Tube 81 travels through the Right Vertical Sleeve Tube 75 when the Transport 126 is raised or lowered.

The Trailer Axle 85 is affixed to the Trailer Right Vertical Lift Tube 81 and to the Trailer Left Vertical Lift Tube 83.

The Trailer Left wheel 86 is a standard road worthy implement wheel and tire. Wheel 86 is connected to the Trailer Axle 85.

The Trailer Right Wheel 87 is a standard road worthy implement wheel and tire. Wheel 87 is connected to the Trailer Axle 85.

Transport Trailer 88 (General Description)

The Transport Trailer Assembly 73 raises and lowers the Transport 126 and Implement 125. The Transport Trailer Assembly 73 also provides wheels to carry the Transport 126 and Implement 125 when the Implement 125 FIG. 3 is in transit. The Transport Trailer Assembly 73 works in conjunction with the Transport Hitch 01 to support the Transport Carrier Assembly 34. The Transport Hitch 01 is connected to a tractors three point hitch, which is used to raise the Hitch 01 when the Implement 125 FIG. 3 is in transit and to lower the Hitch 01 when the Implement 125 FIG. 4 is in ground engaging position. The Transport Trailer Lift Assembly 74 is lowered to the ground when the Implement 125 FIG. 3 is in transit and the Transport Lift Assembly 74 is raised from the ground when the Implement 125 FIG. 4 is in ground engaging position. The Trailer Lift Assembly 74 is controlled by the tractor operator using a tractor hydraulic hand control to operate the Trailer Hydraulic Cylinder 81.

Description of the Transport Turret

The Transport Turret Assembly 89 is illustrated in FIG. 3, FIG. 4, FIG. 7, FIG. 10 and FIG. 11. The parts described in this assembly are numbered 89 thru 124. The descriptions follow in part number sequence.

The Turret Pivot Tube 90 is inserted thru the Turret Pivot Sleeve Tube 94 and thru the Carrier Pivot Sleeve Tube 43. The Turret Pivot Tube 90 provides the pivot for the Transport Carrier Assembly 34 and the Transport Turret Assembly 89. The Transport Carrier Vertical Drive Shaft 50 is positioned thru the center of the Turret Pivot Tube 90, this arrangement puts the Pivot Tube 90 and the Vertical Drive Shaft 50 on the same rotational axis. If mechanical power is not a requirement for the Transport Implement 125 a pivot pin can be used to replace the Turret Pivot Tube 90.

The Turret Pivot Tube Sprocket 91 has a round hole in its center. The Sprocket 91 is placed over the Turret Pivot Tube 90 and fastened to it. The Turret Pivot Tube Sprocket 91 provides a means to rotate the Turret Pivot Tube 90 and thus rotates the entire Transport Turret Assembly 89 and the Implement 125 which is attached to it.

The Turret Pivot Tube Top Collar 92 has a round hole in its center. The Collar 92 is placed over the Turret Pivot Tube 90 and fastened to it. The Top Collar 92 provides a means to hold the Transport Carrier Assembly 34 and the Transport Turret Assembly 89 together during rotation of the Transport Turret Assembly 89.

The Turret Pivot Tube Bottom Collar 93 has a round hole in its center. The Bottom Collar 93 is place over the Turret Pivot Tube 90. The Bottom Collar 90 is fastened to the Turret Pivot Tube 90 and the Turret Bottom Bed Plate 96.

The Turret Pivot Sleeve Tube 94 is constructed using cylindrical tubing. Sleeve Tube 94 is affixed to Turret Top Bed Plate 95 and the Turret Bottom Bed Plate 96.

The Turret Top Bed Plate 95 serves two functions, it is part of the structure of the Transport Turret Assembly 89 and the upper surface of the Turret Top Bed Plate 95 provides an interface to the Transport Base Bottom Bed Plate 42.

The Turret Bottom Bed Plate 96 is affixed to the Turret Pivot Sleeve Tube 94, the Turret Front Support Tube 98, the Turret Back Support Tube 98, the Turret Right Support Tube 99 and the Turret Left Support Tube 100. The Turret Pivot Tube Collar 93 is also affixed to Bed Plate 96.

The Turret Front Support Tube 97 is constructed using rectangular tubing. The Support Tube 97 is affixed to the Turret Top Bed Plate 95, the Turret Bottom Bed Plate 96, the Turret Right Support Tube 99, the Turret Left Support Tube 100, the Turret Right Interface Tube 102, the Turret Left Interface Tube 101, the Turret Right Front Wedge Sleeve Tube 103 and the Turret Left Front Wedge Sleeve Tube 105.

The Turret Back Support Tube 98 is constructed using rectangular tubing. Support Tube 98 is affixed to the Turret Top Bed Plate 95, the Turret Bottom Bed Plate 96, the Turret Right Support Tube 99, the Turret Left Support Tube 100, the Turret Right Interface Tube 102, The Turret Left Interface Tube 101, the Turret Right Rear Wedge Sleeve Tube 104 and the Turret Left Rear Wedge Sleeve Tube 106.

The Turret Right Support Tube 99 is constructed using rectangular tubing. The Support Tube 99 is affixed to the Turret Top Bed Plate 95, the Turret Bottom Bed Plate 96, the Turret Front Support Tube 97 and the Turret Back Support Tube 98.

The Turret Left Support Tube 100 is constructed Using rectangular tubing. The support Tube 100 is affixed to the Turret Top Bed Plate 95, the Turret Bottom Bed Plate 96, the Turret Front Support Tube 97 and the Turret Back Support Tube 98.

The Turret Right Interface Tube 101 is constructed using rectangular tubing. Interface Tube 101 is affixed to the Turret Front Support Tube 97 and the Turret Back Support Tube 98. Interface Tube 101 connects to the frame of the Implement 125.

The Turret Left Interface Tube 102 is constructed using rectangular tubing. The Interface Tube 102 is affixed to the Turret Front Support Tube 97 and the Turret Back Support Tube 98. The Interface Tube 102 connects to the frame of the Implement 126.

The Turret Right Front Wedge Sleeve Tube 103 is constructed using square tubing. The Sleeve Tube 103 is affixed to the Turret Front Support Tube 97, the Turret Top Bed Plate 95 and the Turret Bottom Bed Plate 96.

The Turret Right Rear Wedge Sleeve Tube 104 is constructed using square tubing. The Sleeve Tube 104 is affixed to the Turret Back Support Tube 98, the Turret Top Bed Plate 95 and the Turret Bottom Bed Plate 96.

The Turret Left Front Wedge Sleeve Tube 105 is constructed using square tubing. The Sleeve Tube 105 is affixed to the Turret Front Support Tube 97, the Turret Top Bed Plate 95 and the Turret Bottom Bed Plate 96.

The Turret Left Rear Wedge Sleeve Tube 106 is constructed using square tubing. The Sleeve Tube 106 is affixed to the Turret Back Support Tube 98, the Turret Top Bed Plate 95 and the Turret Bottom Bed Plate 96.

The Turret Right Front Sleeve Tube Lining 107 is constructed using square tubing. The Sleeve Tube Lining 107 is inserted into the Turret Right Front Sleeve Tube 103 and affixed to it. The Sleeve Tube Lining 107 edge is cut at a 45 degree angle from the outside diameter to the inside diameter, with the inside diameter being the low side of the cut. This cut helps guide the Right Front Wedge Tube 63 into the Sleeve Tube Lining 107. This 45 degree cut is made on both ends of the Sleeve Tube Lining 107. The angle cut on the bottom edge of the Sleeve Tube lining provides a beveled edge for the Wedge Tube Fingers 67 to be forced against.

The Turret Right Rear Sleeve Tube Lining 108 is constructed using square tubing. The Sleeve Tube Lining 108 is inserted into the Turret Right Rear Sleeve Tube 104 and affixed to it. The Sleeve Tube Lining 108 edge is cut at a 45 degree angle from the outside diameter to the inside diameter, with the inside diameter being the low side of the cut. This cut helps guide the Right Rear Wedge Tube 64 into the Sleeve Tube Lining 108. This 45 degree cut is made on both ends of the Sleeve Tube Lining 108. The angle cut on the bottom edge of the Sleeve Tube lining 108 provides a beveled edge for the Wedge Tube Fingers 68 to be forced against.

The Turret left Front Sleeve Tube Lining 109 is constructed using square tubing. The Sleeve Tube Lining 109 is inserted into the Turret Left Front Sleeve Tube 105 and affixed to it. The Sleeve Tube Lining 109 edge is cut at a 45 degree angle from the outside diameter to the inside diameter, with the inside diameter being the low side of the cut. This cut helps guide the Left Front Wedge Tube 65 into the Sleeve Tube Lining 109. This 45 degree cut is made on both ends of the Sleeve Tube Lining 109. The angle cut on the bottom edge of the Sleeve Tube lining 109 provides a beveled edge for the Wedge Tube Fingers 69 to be forced against.

The Turret Left Rear Sleeve Tube Lining 110 is constructed using square tubing. The Sleeve Tube Lining 110 is inserted into the Turret Right Rear Sleeve Tube 106 and affixed to it. The Sleeve Tube Lining edge 110 is cut at a 45 degree angle from the outside diameter to the inside diameter, with the inside diameter being the low side of the cut. This cut helps guide the Right Rear Wedge Tube 66 into the Sleeve Tube Lining 110. This 45 degree cut is made on both ends of the Sleeve Tube Lining 110. The angle cut on the bottom edge of the Sleeve Tube lining 110 provides a beveled edge for the Wedge Tube Fingers 70 to be forced against.

The Turret Right Front Pyramid Tube Expander 111 is constructed using a metal casting. The Tube Expander 111 is a pyramid Shape which has a square base and four triangular side meeting at a point. The Tube Expander 111 is affixed to the Turret Right Front Pyramid Base Plate 115.

The Turret Right Rear Pyramid Tube Expander 112 is constructed using a metal casting. The Tube Expander 112 is a pyramid Shape which has a square base and four triangular side meeting at a point. The Tube Expander 112 is affixed to the Turret Right Rear Pyramid Base Plate 116.

The Turret Left Front Pyramid Tube Expander 113 is constructed using a metal casting. The Tube Expander 113 is a pyramid Shape which has a square base and four triangular side meeting at a point. The Tube Expander 113 is affixed to the Turret Left Front Pyramid Base Plate 117.

The Turret Left Rear Pyramid Tube Expander 114 is constructed using a metal casting. The Tube Expander 114 is a pyramid Shape which has a square base and four triangular side meeting at a point. The Tube Expander 114 is affixed to the Turret Left Rear Pyramid Base Plate 118.

The Turret Right Front Pyramid Base Plate 115 is constructed using metal plate. The Turret Right Front Pyramid Tube Expander 111 is affixed to the Pyramid Base Plate 115. The Pyramid Tube Expander 111 is inserted Squarely into the Turret Right Front Wedge Sleeve Tube 103 and the pyramid Base Plate 115 is affixed to the Turret Bottom Bed Plate 96.

The Turret Right Rear Pyramid Base Plate 116 is constructed using metal plate. The Turret Right Rear Pyramid Tube Expander 112 is affixed to the Pyramid Base Plate 116. The Pyramid Tube Expander 112 is inserted Squarely into the Turret Right Rear Wedge Sleeve Tube 104 and the pyramid Base Plate 116 is affixed to the Turret Bottom Bed Plate 96.

The Turret left Front Pyramid Base Plate 117 is constructed using metal plate. The Turret left Front Pyramid Tube Expander 113 is affixed to the Pyramid Base Plate 117. The Pyramid Tube Expander 113 is inserted Squarely into the Turret Left Front Wedge Sleeve Tube 105 and the pyramid Base Plate 117 is affixed to the Transport Base Bottom Bed Plate 96.

The Turret Left Rear Pyramid Base Plate 118 is constructed using metal plate. The Turret Left Rear Pyramid Tube Expander 114 is affixed to the Pyramid Base Plate 118. The Pyramid Tube Expander 114 is inserted Squarely into the Turret Left Rear Wedge Sleeve Tube 106 and the pyramid Base Plate 118 is affixed to the Turret Bottom Bed Plate 96.

The Turret Gear Box 119 is a right angle gear box. The Turret Gear Box 119 is affixed to the Turret Bottom Bed Plate 96 by the Turret Gear Box Mounting Brackets 123. The Turret Gear Box 119 is mounted directly below the Turret Pivot Tube 90. The Turret Gear Box Vertical Power Shaft 120 points directly up through the center of the Turret Pivot Tube 90. The Turret Gear Box Vertical Power Shaft 120 and the Turret Pivot Tube 90 rotate on the same axis.

The Transport Turret Gear Box Vertical Power Shaft 120 connects to the Transport Carrier Vertical Drive Shaft 50. Mechanical power is transmitted thru Shaft 50 to the Transport Turret Gear Box Vertical Power Shaft 120.

The Transport Turret Gear Box Right Horizontal Power Shaft 121 Provides mechanical power to the Implement 125.

The Transport Turret Gear Box Left Horizontal Power Shaft 122 provides mechanical power to the Implement 125.

The Transport Turret Gear Box Mounting Bracket 123 is affixed to the Transport Turret Bottom Bed Plate 96 and to the Transport Turret Gear Box 119, to support Gear Box 119.

The Transport Turret 124 (General Description)

The Transport Turret Assembly 89 is the interface mechanism between the Transport Carrier Assembly 34 and the Transport Implement 125. The Transport Turret Assembly 89 is located under the Transport Carrier Assembly 34 and it rotates on the Transport Pivot Tube 90. The Transport Implement 125 is affixed to the Turret Assembly 89 at the Turret Right Interface Tube 101 and the Turret Interface Tube 102. The Transport Turret Assembly 89 can be rotated ninety degrees, to position the Transport Implement 125 for transport or in position for ground engaging work. When the Transport Turret 89 is rotated to transport position as shown in FIG. 3 or to working position as shown in FIG. 4, it is affixed to the Transport Carrier Assembly 34 by the Transport Carrier Wedge Tubes 63, 64, 65 and 66. The Wedge Tube 63, 64, 65 and 66 are inserted into and extracted out of the Transport Turret Wedge Sleeve Tubes 103, 104, 105 and 106 by the Transport Carrier Hydraulic Cylinders 55, 56, 57 and 58. The Hydraulic Cylinders 55, 56, 57 and 58 are activated by the tractor operator using a hand control of the tractors hydraulic system. The Hydraulic Cylinders 55, 56, 57 and 58 are activated and operated concurrently. When the Transport Turret Wedge Tubes 63, 64, 65 and 66 are inserted into the Transport Turret Wedge Sleeve Tubes 103, 104, 105 and 106 the Transport Carrier Assembly 34 and the Transport Turret Assembly 89 are affixed together at five places, the Transport Pivot Tube 90 and the four Transport Carrier Wedge Tubes 63, 64, 65 and 66. These five connections between the Transport Carrier Assembly 34 and the Transport Turret Assembly 89 provide the means to support the stress distributed between these two assemblies during transport and working conditions.

The Transport Turret Gear Box 119 has a unique Characteristic in that the Transport Vertical Power Shaft 120 points directly up thru the center of the Transport Pivot Tube 90. This puts Power Shaft 120 and Pivot Tube 90 on the same rotational axis. This alignment provides that the Turret Assembly 89 can be rotated ninety degrees and Transport Turret Gear Box Vertical Power Shaft 120 and the Transport Carrier Gear Box Vertical Power Shaft 47 Stay in perfect alignment. Power Shaft 47 and Power Shaft 120 are connected by the Transport Carrier Vertical Drive Shaft 50. This same axis alignment eliminates binding problems when rotating the Turret Assembly 89, it also provides for very efficient and smooth mechanical energy transfer to the Transport Implement 125.

End of Description 124

The Transport Implement 125 is an implement that is designed to interface to the Implement Transport 126. The Implement 125 is affixed to the Transport Turret Assembly 89 at the Transport Turret Right Interface tube 101 and at the Transport Turret Left Interface Tube 102. The Implement 125 receives mechanical power from the Transport Turret Gear Box Right Horizontal Power Shaft 121 and the Transport Turret Gear Box Left Horizontal Power Shaft 122.

Implement Transport PLUS 126 (General Description)

The Implement Transport 126 is designed to be used in conjunction with a farm tractor. The Implement Transport 126 uses the tractors three point hitch, the hydraulic system and the mechanical power take off. The Implement Transport 126 consist of four major assemblies, they are the Transport Hitch Assembly 01, the Transport Carrier Assembly 34, the Transport Trailer Assembly 73 and the Transport Turret Assembly 89. The Transport Hitch Assembly 01 connects to the tractors three point hitch. Mechanical power is routed thru the Hitch Assembly o1. The three point hitch also raises and lowers the Hitch Assembly 01 and thus the front of the Implement Transport 126. The Transport Carrier Assembly 34 is the interface mechanism to the Hitch Assembly 01, the Trailer Assembly 73 and the Turret Assembly 89. The Transport Carrier Assembly 34 carriers the Transport Turret Assembly 89 and Implement 125. The Transport Carrier Assembly 34 also rotates the Turret assembly 89 and the Implement 125. The Transport Trailer Assembly 73 raises and lowers the Trailer lift Assembly 74 which provides Trailer Wheels 86 and 87 for transport mode. The Transport Turret Assembly 89 is the interface mechanism for the Implement 125. The Turret Assembly 89 also provides a mechanism to rotate the Implement 125 ninety degrees for transport mode or working mode.

The Implement Transport 126 operates in two modes. The transport mode is shown in FIG. 3, the Hitch Assembly 01 is raised, the Trailer Lift Assembly 74 is down and the Turret Assembly 89 is rotated with the narrow side of Implement 125 parallel to the Carrier Tongue 37. In transport mode the Implement Transport 126 becomes a hitch and a trailer for the Transport Implement 125. The Implement Transport 126 picks up the Implement 125 rotates it Narrow side Parallel to the Carrier Tongue Tube 37 and carries it while in transit. The unique height of the Hitch Assembly 01 provides the height needed by the Carrier Assembly 34 to carry the Turret Assembly 89 and the Implement 125. The working mode is shown in FIG. 4. The Hitch Assembly 01 is lowered, the Trailer Lift Assembly 74 is raised and the Turret Assembly 89 is rotated with the narrow side of Implement 125 perpendicular to the Carrier Tongue 37. In working mode the Implement Transport 126 becomes a hitch and tongue for the Implement 125. Switching the Transport 126 From transport mode to working mode and from working mode to transport mode is done by the tractor operator using the tractor hydraulic controls located by the seat. Four Hydraulic controls are required to operate the Implement Transport 126. The first hydraulic control is used to raise and lower the Transport Hitch 01. The Second hydraulic control is used to raise and lower the Transport Trailer Lift Assembly 74. The Third hydraulic control is used operate the Steering Motor 48, which rotates the Turret Assembly 89 and the Implement 125, when they are lifted off the ground. The forth hydraulic control inserts and retracts the Wedge Tubes 63, 64, 65 and 66 when the Turret Assembly 89 is fully rotated to transport or working position.

A unique characteristic of the Implement Transport 126 is the use of the Transport Hitch Pivot Tube 11. By using a pivot tube versus a pivot pin, the Hitch Vertical Drive Shaft 25 could be routed thru the center of the Hitch Pivot Tube 11. The Vertical Drive Shaft 25 is connected to the Hitch PTO Gear Box Vertical Power Shaft 27. The Hitch Power Take off Gear Box 26 is affixed stationary to the Hitch Main Frame Assembly 31. The Hitch Main Frame Assembly 31 is affixed Stationary to the farm tractors three point hitch and therefore the Hitch Power Take off Gear Box 26 is stationary to the tractors power take off. The Hitch PTO Gear Box Vertical Power Shaft 27 stays aligned stationary to the Hitch Pivot Tube 11 and the Hitch PTO Gear Box Horizontal Power Shaft 28 stays aligned stationary to the tractors power take off shaft.

The Hitch Tongue Gear Box 02 is affixed stationary to the Hitch Tongue Assembly 32. The Hitch Tongue Assembly 32 rotates horizontally on the Hitch Tongue Pivot Tube 11. The Hitch Tongue Gear Box 02 is affixed to the Hitch Tongue Assembly 32 so as to align the rotational axis of the Hitch Tongue Gear Box Vertical Power Shaft 04 with the rotational axis of the Hitch Pivot Tube 11. When the Hitch Tongue Assembly 32 rotates on the Hitch Pivot Tube 11, the Hitch Tongue Gear Box Vertical Power Shaft 04 rotates on the same axis as the Hitch Pivot Tube 11. Since the Hitch Tongue Gear Box 02 is affixed stationary to the Hitch Tongue Assembly 32, the Hitch Tongue Gear Box Horizontal Power Shaft 03 is always aligned with the Hitch Tongue tube 06 and the Carrier Tongue Horizontal Drive Shaft 36. This arrangement provides that no stress from mis-alignment is placed on the Hitch Tongue Gear Box 02 or on the Hitch PTO Gear Box 26 during Maneuvers of the Implement Transport 126.

Another unique characteristic of the Implement Transport 126 is the use of the Transport Turret Pivot Tube 90. By using a pivot tube versus a pivot pin the Transport Carrier Vertical Drive Shaft 50 could be routed thru the center of the Turret Pivot Tube 90. The Carrier Vertical Drive Shaft 50 is connected to the Carrier Gear Box Vertical Power Shaft 47. The Transport Carrier Gear Box 44 receives mechanical power from the Hitch Tongue Gear Box 02 thru the Carrier Tongue Horizontal Drive Shaft 36. The Carrier Gear Box 44 is affixed stationary to the Carrier Top Bed Plate 41. Therefore the Carrier Gear Box Horizontal Power Shaft 46 is aligned stationary to the Hitch PTO Gear Box Horizontal Power Shaft 28. The Power Shaft 46 and the Power Shaft 28 are connected by the Carrier Tongue Horizontal Drive Shaft 36. The Carrier Gear Box Vertical Power Shaft 47 is aligned stationary to the center of the Turret Pivot Tube 90, and shares the same axis as the Turret Pivot Tube 90.

The Turret Gear Box 119 is affixed stationary to the Turret Bottom Bed Plate 96 of the Turret Assembly 89. The Turret Assembly 89 rotates horizontally on the Transport Turret Pivot Tube 90. The Turret Gear Box 119 is affixed to the Turret Assembly 89 so as to align the rotational axis of the Turret Gear Box Vertical Power Shaft 120 with the rotational axis of the Turret Pivot Tube 90. This arrangement provides that no stress from mis-alignment is placed on the Carrier Gear Box 44 or the Turret Gear Box 119 during the maneuvers of the Implement Transport 126. The use and arrangement of the Hitch Tongue Pivot Tube 11 and the Turret Pivot Tube 90 provides for and energy efficient and smooth transfer of mechanical power from the farm tractor to the Transport Implement 125.

What is claimed is:

1. An implement transport assembly, comprising:
   an elongated transport trailer assembly having forward and rearward ends and a bottom center portion,
   a wheel assembly on the rearward end of the trailer assembly,
   means on the trailer assembly for raising and lowering the wheel assembly,
   tongue means on the forward end of the trailer assembly adapted for connection to a prime mover,
   a turret rotatably mounted about a vertical axis to the bottom center portion of the trailer assembly,
   means on said turret for rotating the same about a vertical axis,
   means on said turret for securing thereto an elongated implement,
   and releasable lock means for holding the turret against rotation.

2. The implement transport assembly as defined in claim 1, further comprising a means to position the height of the tongue means to interface with the trailer assembly.

3. The implement transport assembly as defined in claim 1, wherein the tongue means further comprises a hitch lower right link connector, a hitch upper link connector, a hitch lower left link connector and a means to connect the tongue means to a three point hitch assembly of a tractor.

4. The implement transport assembly as defined in claim 3, wherein the tongue means further comprises a hitch pivot tube, a hitch vector bar pivot pin, and a means for rotating the hitch vector bar and the tongue of the carrier assembly about the same axis.

5. The implement transport assembly as defined in claim 4, wherein the tongue means further comprises a means to relieve stress on the hitch assembly by distributing force through the tongue and the hitch vector bar.

6. The implement transport assembly as defined in claim 5, wherein the tongue means further comprises a hitch top frame sleeve tube, a hitch upper cross member sleeve tube, and a hitch tongue sleeve tube.

7. The implement transport assembly as defined in claim 6, wherein the tongue means further comprises a hitch tongue gear box, a hitch tongue gear box horizontal power shaft, and a means to keep the gear box horizontal power shaft aligned with a carrier tongue horizontal drive shaft.

8. The implement transport assembly as defined in claim 7, wherein the trailer assembly further comprises a carrier gear box, a carrier gear box horizontal power, shaft carrier gear box mounting brackets, and a means to align the carrier gear box horizontal power shaft with the carrier tongue horizontal drive shaft.

9. The implement transport assembly as defined in claim 6, wherein the tongue means further comprises a hitch pivot tube collar, a hitch upper horizontal cross member tube, and a means to insert the hitch pivot tube through the hitch upper cross member sleeve tube, the hitch tongue sleeve tube and the hitch top frame sleeve tube and a means to affix the hitch pivot tube to the hitch upper horizontal cross member tube.

10. The implement transport assembly as defined in claim 1, wherein the tongue means further comprises a hitch tongue gear box vertical power shaft, a hitch vertical drive shaft, a hitch power take-off gear box, a hitch PTO gear box vertical power shaft, and a means for the hitch pivot tube and the hitch drive shaft to rotate on the same axis.

11. The implement transport assembly as defined in claim 1, further comprising a hitch tongue tube, a hitch tongue pivot pin, a carrier tongue tube and carrier tongue connecting pin holes, and a means for rotating the tongue means and the trailer assembly about the horizontal axis.

12. The implement transport assembly as defined in claim 1, further comprising a main frame, wherein the main frame supports the carrier assembly, the hitch assembly, the trailer assembly and the turret assembly.

13. The implement transport assembly as defined in claim 1, further comprising a carrier gear box vertical power shaft, a turret pivot tube, and a means for rotating the carrier gear box vertical power shaft and the turret pivot tube on the same axis.

14. The implement transport assembly as defined in claim 1, further comprising a carrier hydraulic steering motor, a carrier steering chain, and a turret pivot tube sprocket.

15. The implement transport assembly as defined in claim 1, wherein the trailer assembly further comprises a carrier right front wedge sleeve tube, a carrier right front hydraulic cylinder, a carrier right front mounting bracket, a carrier right front wedge tube, and a means to insert and retract the carrier right front wedge tube through the carrier right front wedge sleeve tube.

16. The implement transport assembly as defined in claim 1, wherein the trailer assembly further comprises a carrier right rear wedge sleeve tube, a carrier right rear hydraulic cylinder, a carrier right rear mounting bracket, a carrier right rear wedge tube, and a means to insert and retract the carrier right rear wedge tube thru the carrier right rear wedge sleeve tube.

17. The implement transport assembly as defined in claim 1, wherein the trailer assembly further comprises a carrier left front wedge sleeve tube, a carrier left front hydraulic cylinder, a carrier left front mounting bracket, a carrier left front wedge tube, and a means to insert and retract the carrier left front wedge tube thru the carrier left front wedge sleeve tube.

18. The implement transport assembly as defined in claim 1, wherein the carrier assembly further comprises a carrier left rear wedge sleeve tube, a carrier left rear hydraulic cylinder, a carrier left rear mounting bracket, a carrier left rear wedge tube, and a means to insert and retract the carrier left rear wedge tube through the carrier left rear wedge sleeve tube.

19. The implement transport assembly as defined in claim 1, further comprising a plurality of carrier wedge sleeve tubes, a carrier pivot sleeve tube and a turret pivot tube, a plurality of turret wedge sleeve tubes, and a means for the carrier wedge sleeve tubes to align with the turret wedge sleeve tubes when the turret is rotated and positioned at ninety degree intervals.

20. The implement transport assembly as defined in claim 1, further comprising four carrier hydraulic cylinders, four carrier wedge tubes, four sets of carrier wedge tube fingers, four turret wedge sleeve tubes, four turret wedge sleeve tube linings, four turret pyramid tube expanders, four turret pyramid base plates, and a means to insert the four carrier wedge tubes thru the four turret wedge sleeve tube linings and force the four sets of carrier wedge tube fingers against the four turret wedge sleeve tube linings.

21. The implement transport assembly as defined in claim 1, further comprising a turret pivot tube, a turret pivot tube top collar, a carrier top bed plate, a turret pivot tube bottom collar, a turret bottom bed plate, and a means to hold the trailer assembly and the turret assembly together during rotation of the turret assembly.

22. The implement transport assembly as defined in claim 1, further comprising a carrier tongue tube, a carrier right horizontal frame tube, a carrier left horizontal frame tube, a carrier top plate, a carrier bottom plate, a carrier pivot sleeve tube, a carrier right front wedge sleeve tube, a carrier right rear wedge sleeve tube, a carrier left front wedge sleeve tube, and a carrier left rear wedge sleeve tube.

23. The implement transport assembly as defined in claim 1, further comprising a turret pivot sleeve tube, a turret top bed plate, a turret bottom bed plate, a turret front support tube, a turret back support tube, a turret right support tube, a turret left support tube, a turret right interface tube, a turret left interface tube, a turret right front wedge sleeve tube, a turret right rear wedge sleeve tube, a turret left front wedge sleeve tube and a turret left rear wedge sleeve tube.

24. The implement transport assembly as defined in claim 1, further comprising a carrier gear box, a carrier gear box vertical power shaft, a carrier vertical drive shaft, a turret pivot tube, a turret gear box, a turret gear box vertical power shaft, and a means for rotating the carrier gear box vertical power shaft, the carrier vertical drive shaft, the turret pivot tube and the turret gear box vertical power shaft about the same axis.

25. The implement transport assembly as defined in claim 1, further comprising a turret gear box, a turret gear box right horizontal power shaft, a turret gear box left horizontal power shaft, turret gear box mounting brackets, a turret bottom bed plate, and a means to mount the turret gear box on the turret assembly and provide mechanical power to the implement.

26. The implement transport assembly as defined in claim 1, wherein a trailer hydraulic cylinder is used to raise and lower the rear of the implement transport assembly.

27. The implement transport assembly as defined in claim 1, wherein the trailer assembly further comprises a trailer right vertical sleeve tube, a trailer left vertical sleeve tube, a trailer right sleeve tube brace, a trailer left sleeve tube brace, a trailer top horizontal support tube and a trailer bottom horizontal support tube.

28. A method of transporting an elongated field implement in a direction along its longitudinal axis to permit the field implement to be moved in a longitudinal direction when in a travel mode, and then moved into a lateral position for field work, comprising:

providing an elongated trailer having a center portion with an underside and opposite ends, and rearward wheels, providing a rotatable turret on the underside of the trailer adjacent its center portion, lowering the wheels to raise the trailer over an elongated implement having a length less than the trailer, connecting the center of the implement to the turret, rotating the turret 90° to align the implement and the trailer, moving the trailer and the implement longitudinally to a field to be worked, rotating the turret 90° to move the implement to a laterally extended position for field work, and raising the wheels to lower the field implement to the ground.

29. The method of claim 28 wherein the trailer is pulled through the field to allow the implement to engage the ground surface.

* * * * *